US006815011B2

(12) United States Patent
Eaton et al.

(10) Patent No.: US 6,815,011 B2
(45) Date of Patent: Nov. 9, 2004

(54) ALPHA OLEFIN MONOMER PARTITIONING AGENTS FOR DRAG REDUCING AGENTS AND METHODS OF FORMING DRAG REDUCING AGENTS USING ALPHA OLEFIN MONOMER PARTITIONING AGENTS

(75) Inventors: Gerald B. Eaton, Houston, TX (US); Michael J. Monahan, Katy, TX (US); Alan K. Ebert, Houston, TX (US)

(73) Assignee: Energy & Environmental International, L.C., Brookshire, TX (US)

( * ) Notice: Subject to any disclaimer, the term of this patent is extended or adjusted under 35 U.S.C. 154(b) by 0 days.

(21) Appl. No.: 09/962,784

(22) Filed: Sep. 25, 2001

(65) Prior Publication Data

US 2002/0065202 A1 May 30, 2002

Related U.S. Application Data

(60) Provisional application No. 60/253,279, filed on Nov. 27, 2000.

(51) Int. Cl.[7] .................................................. B05D 7/22

(52) U.S. Cl. ....................................... 427/445; 508/591

(58) Field of Search ........................... 427/445; 508/591

(56) References Cited

U.S. PATENT DOCUMENTS

| | | | |
|---|---|---|---|
| 3,542,044 A | 11/1970 | Hanson et al. | |
| 3,645,822 A | 2/1972 | Widiger et al. | |
| 3,669,948 A | 6/1972 | Konotsune et al. | |
| 3,692,676 A | 9/1972 | Cutler et al. | |
| 3,730,275 A | 5/1973 | McClaflin et al. | |
| 3,736,288 A | 5/1973 | Stratta et al. | |
| 3,767,561 A | 10/1973 | Rossi et al. | |
| 3,791,913 A | 2/1974 | Ver Strate et al. | |
| 3,843,589 A | 10/1974 | Wartman | |
| 3,857,795 A | 12/1974 | Van Der Bend et al. | |
| 3,884,252 A | 5/1975 | Kruka | |
| 3,901,789 A | * 8/1975 | Michael et al. | ............... 208/33 |
| 3,944,529 A | 3/1976 | Creemers | |
| 3,951,935 A | 4/1976 | Engelmann | |
| 4,057,680 A | 11/1977 | Yamazaki et al. | |
| 4,142,991 A | 3/1979 | Arzoumanidis et al. | |
| 4,147,677 A | 4/1979 | Lundberg et al. | |
| 4,190,069 A | 2/1980 | Krantz | |
| 4,212,312 A | 7/1980 | Titus | |
| 4,262,104 A | 4/1981 | Wristers | |
| 4,263,926 A | 4/1981 | Drake et al. | |
| 4,267,292 A | 5/1981 | Benton et al. | |
| 4,282,114 A | 8/1981 | Ito et al. | |
| 4,289,679 A | 9/1981 | Mack | |
| 4,294,947 A | 10/1981 | Doerk et al. | |
| 4,329,253 A | 5/1982 | Goodall et al. | |
| 4,333,488 A | 6/1982 | McClaflin | |
| 4,335,964 A | 6/1982 | Drake et al. | |
| 4,340,076 A | 7/1982 | Weitzen | |
| 4,358,572 A | 11/1982 | Mack et al. | |
| 4,371,455 A | 2/1983 | Mack et al. | |
| 4,384,089 A | 5/1983 | Dehm | |
| 4,393,182 A | 7/1983 | Goodall et al. | |
| 4,395,358 A | 7/1983 | Wristers | |
| 4,415,714 A | 11/1983 | Mack | |
| 4,426,317 A | 1/1984 | Rogers | |
| 4,433,123 A | * 2/1984 | Mack | .......................... 526/139 |
| 4,478,951 A | 10/1984 | Huff | |
| 4,485,186 A | 11/1984 | Ueno et al. | |
| 4,493,903 A | 1/1985 | Mack | |
| 4,493,904 A | 1/1985 | Mack | |
| 4,522,982 A | 6/1985 | Ewen | |
| 4,539,374 A | 9/1985 | Fenton et al. | |
| 4,584,244 A | 4/1986 | Fenton | |
| 4,642,410 A | 2/1987 | Loveless | |
| 4,656,204 A | 4/1987 | Duvdevani et al. | |
| 4,659,685 A | 4/1987 | Coleman, III et al. | |
| H316 H | 8/1987 | Kowalik et al. | |
| 4,693,321 A | 9/1987 | Royer | |
| 4,713,444 A | 12/1987 | Matsuyama et al. | |
| 4,720,397 A | 1/1988 | O'Mara et al. | |

(List continued on next page.)

FOREIGN PATENT DOCUMENTS

| | | |
|---|---|---|
| CA | 901727 | 5/1972 |
| EP | 0005215 A | 11/1979 |
| EP | 0108156 A | 5/1984 |
| EP | 0196350 A1 | 8/1986 |
| EP | 0196350 B1 | 11/1989 |
| EP | 0535230 A | 4/1993 |
| EP | 0292797 A | 11/1998 |
| GB | 2074175 A | 10/1981 |
| GB | 2093466 | 9/1982 |
| JP | 2-124904 | 5/1990 |
| WO | WO 95/00563 | 1/1995 |

OTHER PUBLICATIONS

John Boor, Jr., Ziegler–Natta Catalysts and Polymerizations, 1979, Chapter 18: Kinetics, pp. 464–511, Academic Press, New York, USA.

(List continued on next page.)

*Primary Examiner*—Elena Tsoy
(74) *Attorney, Agent, or Firm*—Andrews Kruth LLP; Anthony F. Matheny

(57) ABSTRACT

A composition including a polyalphaolefin and at least one alpha olefin monomer partitioning agent that function as drag reducing agents and a process for the preparation of the drag reducing agents are disclosed. The process includes the steps of contacting alpha olefin monomers with at least one catalyst in a reactant mixture to form a polyalphaolefin. The reactant mixture may include at least one alpha olefin partitioning agent or the at least one alpha olefin partitioning agent may be mixed with the polyalphaolefin after polymerization. The alpha olefin monomer partitioning agents are alpha olefin monomers that are solid at ambient temperatures. Preferably, the alpha olefin monomers are selected from the group consisting of $C_{20}$–$C_{60}$ alpha olefin monomers. A process for reducing drag in a conduit is also disclosed.

29 Claims, No Drawings

U.S. PATENT DOCUMENTS

| | | |
|---|---|---|
| 4,724,255 A | 2/1988 | Lofgren et al. |
| 4,756,326 A | 7/1988 | Johnston |
| 4,758,354 A | 7/1988 | O'Mara et al. |
| 4,771,799 A | 9/1988 | Baxter et al. |
| 4,771,800 A | 9/1988 | Pomeroy |
| 4,789,383 A | 12/1988 | O'Mara et al. |
| 4,797,461 A | 1/1989 | Aubanel et al. |
| 4,826,728 A | 5/1989 | O'Mara et al. |
| 4,837,249 A | 6/1989 | O'Mara et al. |
| 4,845,178 A | 7/1989 | Hostetler et al. |
| 4,881,566 A | 11/1989 | Ubels et al. |
| 4,900,461 A | 2/1990 | Ver Strate et al. |
| 4,940,682 A | 7/1990 | Sasaki et al. |
| 4,945,142 A | 7/1990 | Gessell et al. |
| 4,952,738 A | 8/1990 | Gessell et al. |
| 4,959,436 A | 9/1990 | Cozewith et al. |
| 5,070,160 A | 12/1991 | Tomotsu et al. |
| 5,080,121 A | 1/1992 | Malik et al. |
| 5,081,087 A | 1/1992 | Villena et al. |
| 5,104,839 A | 4/1992 | McDaniel et al. |
| 5,122,584 A | 6/1992 | Takahashi |
| 5,151,399 A | 9/1992 | Job |
| 5,162,277 A | 11/1992 | Job |
| 5,165,441 A | 11/1992 | Mitchell |
| 5,238,892 A | 8/1993 | Chang |
| 5,241,025 A | 8/1993 | Hlatky et al. |
| 5,243,001 A | 9/1993 | Winter et al. |
| 5,244,937 A | 9/1993 | Lee et al. |
| 5,276,116 A | 1/1994 | Gessell et al. |
| 5,276,220 A | 1/1994 | Samsel et al. |
| 5,278,264 A | 1/1994 | Spaleck et al. |
| 5,298,474 A | 3/1994 | Luciani et al. |
| 5,298,579 A | 3/1994 | Hoff et al. |
| 5,304,614 A | 4/1994 | Winter et al. |
| 5,310,716 A | 5/1994 | Luciani et al. |
| 5,320,994 A | 6/1994 | Bujadoux et al. |
| 5,326,835 A | 7/1994 | Ahvenainen et al. |
| 5,328,969 A | 7/1994 | Winter et al. |
| 5,348,925 A | 9/1994 | Milani et al. |
| 5,349,032 A | 9/1994 | Miyake et al. |
| 5,350,817 A | 9/1994 | Winter et al. |
| 5,356,848 A | 10/1994 | Brusson et al. |
| 5,359,015 A | 10/1994 | Jejelowo |
| 5,364,994 A | 11/1994 | Scharf |
| 5,373,072 A | 12/1994 | Chang |
| 5,374,752 A | 12/1994 | Winter et al. |
| 5,376,697 A | 12/1994 | Johnston et al. |
| 5,384,298 A | 1/1995 | Inahara et al. |
| 5,395,810 A | 3/1995 | Shamshoum et al. |
| 5,416,178 A | 5/1995 | Winter et al. |
| 5,416,179 A | 5/1995 | Welch et al. |
| 5,434,115 A | 7/1995 | Yamada et al. |
| 5,436,212 A | 7/1995 | Geerts |
| 5,442,019 A | 8/1995 | Agapiou et al. |
| 5,449,732 A * | 9/1995 | Smith et al. .............. 526/348.3 |
| 5,480,849 A | 1/1996 | Gustafsson et al. |
| 5,480,948 A | 1/1996 | Geerts |
| 5,504,131 A | 4/1996 | Smith et al. |
| 5,504,132 A * | 4/1996 | Smith et al. ................ 524/401 |
| 5,521,242 A | 5/1996 | Supcoe et al. |
| 5,539,044 A | 7/1996 | Dindi et al. |
| 5,541,270 A | 7/1996 | Chinh et al. |
| 5,574,116 A | 11/1996 | Bujadoux et al. |
| 5,585,447 A | 12/1996 | Adisson et al. |
| 5,604,171 A | 2/1997 | Collette et al. |
| 5,639,842 A | 6/1997 | Tsutsui |
| 5,644,007 A | 7/1997 | Davidson et al. |
| 5,668,228 A | 9/1997 | Chinh et al. |
| 5,705,577 A | 1/1998 | Rossi et al. |
| 5,710,224 A | 1/1998 | Alt et al. |
| 5,712,365 A | 1/1998 | Arai et al. |
| 5,728,855 A | 3/1998 | Smith et al. |
| 5,733,953 A | 3/1998 | Fairchild et al. |
| 5,858,904 A | 1/1999 | Takeuchi et al. |
| 5,869,570 A | 2/1999 | Eaton et al. |
| 5,932,670 A | 8/1999 | Koppl et al. |
| 6,015,779 A | 1/2000 | Eaton et al. |
| 6,126,872 A | 10/2000 | Kommareddi et al. |
| 6,160,036 A * | 12/2000 | Kommareddi et al. ...... 523/175 |
| 6,162,773 A | 12/2000 | Eaton et al. |
| 6,172,151 B1 * | 1/2001 | Johnston et al. ............ 524/379 |
| 6,178,980 B1 | 1/2001 | Storm |
| 6,242,395 B1 | 6/2001 | Eaton et al. |
| 6,399,676 B1 | 6/2002 | Labude et al. |

OTHER PUBLICATIONS

Tad W. Taylor, et al., Physiochemical Kinetics of Liquid Phase Propylene Polymerization, pp. 191–223, Eleventh Midland Macromolecular Meeting, Aug. 17–21, 1981, MMI Press, Midland, Michigan, USA.

B.M. Grieveson, Kinetics of the Polymerization of Ethylene with a Ziegler–Natta Catalyst, 1965, Die Makromolekulare Chemie, vol. 84, pp. 93–107.

Lutz Wohlfarth, Alternating Copolymerization of Butadiene and a Propene with the VO9ONeo)2Cl/Al(iso–Bu)3 System 2: Influence of Electron Donors at a Polymerization Temperature of –45 C, 1991, Paste and Kautschuk, vol. 38, No. 9, pp. 297–299 (translation pp. 1–7).

English Language Abstract of Japanese patent application entitled "Preparation of Ethylene–Alpha–Olefin Copolymer," dated May 14, 1990.

Miscellaneous Patent Summary, pp. 1–118.

Miscellaneous Patent Search, pp. 1–77, dated Aug. 9, 2001.

Miscellaneous Patent Search, pp. 1–204, dated Aug. 13, 2001.

\* cited by examiner

US 6,815,011 B2

ALPHA OLEFIN MONOMER PARTITIONING AGENTS FOR DRAG REDUCING AGENTS AND METHODS OF FORMING DRAG REDUCING AGENTS USING ALPHA OLEFIN MONOMER PARTITIONING AGENTS

RELATED APPLICATION

This application claims the benefit of U.S. Provisional Patent Application Ser. No. 60/253,279, filed Nov. 27, 2000.

BACKGROUND OF THE INVENTION

1. Field of the Invention

This invention relates to partitioning agents, or coating agents, for use in connection with drag reducing agents, and in particular, alpha olefin monomer partitioning agents used in methods for improving flow of hydrocarbons through conduits, particularly pipelines. The invention also relates to methods for making improved drag reducing agents.

2. Description of Related Art

Generally speaking, the flow of liquid in a conduit, such as a pipeline, results in frictional energy losses. As a result of this energy loss, the pressure of the liquid in the conduit decreases along the conduit in the direction of the flow. For a conduit of fixed diameter, this pressure drop increases with increasing flow rate. When the flow in the conduit is turbulent (Reynold's number greater than about 2100), certain high molecular weight polymers can be added to the liquid flowing through the conduit to reduce the frictional energy losses and alter the relationship between pressure drop and flow rate. These polymers are sometimes referred to as drag reducing agents ("DRAs"), and they interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow can be achieved. DRAs can also decrease the cost of pumping fluids, the cost of equipment used to pump fluids, and provide for the use of a smaller pipe diameter for a given flow capacity. Accordingly, an ongoing need exists to formulate improved drag reducing materials.

While various polymerization methods, reactants, and partitioning agents have been published in the patent literature, many of those methods utilize expensive partitioning agents that adversely effect the hydrocarbons transported through the conduit. In many, if not all, instances, these partitioning agents remain in the hydrocarbon stream thereby fouling the hydrocarbon and decreasing the number of uses of the hydrocarbon and/or the effectiveness of the use of the hydrocarbon. In certain aspects, the present invention overcomes one or more of the above-mentioned shortcomings.

While various partitioning agents have been used in connection with certain drag reducing agents, the inventors are not aware of any patents or publications showing alpha olefin monomers as being used as partitioning agents in connection with drag reducing agents (DRAs). For example, U.S. Pat. Nos. 4,720,397; 4,789,383; 4,826,728; 4,837,249; 5,244,937; 5,449,732; 5,504,131; 5,504,132; 5,539,044; and 6,172,151 disclose certain partitioning agents, but do not disclose or suggest the alpha olefin monomer partitioning agents of the present invention.

SUMMARY OF INVENTION

In accordance with the invention the foregoing advantages have been achieved through the present process for forming a drag reducing agent comprising a polyalphaolefin and at least one alpha olefin monomer partitioning agent, the process comprising: contacting alpha olefin monomers with a catalyst in a reactant mixture, wherein the reactant mixture includes at least one alpha olefin monomer partitioning agent; and polymerizing the alpha olefin monomers, wherein during the polymerization, at least a portion of the alpha olefin monomer polymerize in the reactant mixture to provide a polyalphaolefin.

A further feature of the process for forming a drag reducing agent comprising a polyalphaolefin and at least one alpha olefin monomer partitioning agent is that the catalyst may be a transition metal catalyst. Another feature of the process for forming a drag reducing agent comprising a polyalphaolefin and at least one alpha olefin monomer partitioning agent is that the transition metal catalyst may be a Ziegler-Natta catalyst. An additional feature of the process for forming a drag reducing agent comprising a polyalphaolefin and at least one alpha olefin monomer partitioning agent is that the Ziegler-Natta catalyst may be titanium trichloride. Still another feature of the process for forming a drag reducing agent comprising a polyalphaolefin and at least one alpha olefin monomer partitioning agent is that the reactant mixture may include at least one co-catalyst. A further feature of the process for forming a drag reducing agent comprising a polyalphaolefin and at least one alpha olefin monomer partitioning agent is that the at least one co-catalyst may be selected from the group consisting of alkylaluminoxanes, halohydrocarbons, diethylaluminum chloride, and dibutylaluminum chloride. Another feature of the process for forming a drag reducing agent comprising a polyalphaolefin and at least one alpha olefin monomer partitioning agent is that the alpha olefin monomers may comprise homopolymers, terpolymers or copolymers. An additional feature of the process for forming a drag reducing agent comprising a polyalphaolefin and at least one alpha olefin monomer partitioning agent is that the alpha olefin monomers may comprise co-polymers of 1-hexene and 1-dodecene alpha olefins or co-polymers of 1-octene and 1-tetradodecene alpha olefins. Still another feature of the process for forming a drag reducing agent comprising a polyalphaolefin and at least one alpha olefin monomer partitioning agent is that the polyalphaolefin may be an ultra-high molecular weight polyalphaolefin having an inherent viscosity of at least about 10 deciliters per gram and is amorphous with substantially no crystalline particles. A further feature of the process for forming a drag reducing agent comprising a polyalphaolefin and at least one alpha olefin monomer partitioning agent is that the at least one alpha olefin monomer partitioning agent may be selected from the group consisting of $C_{20}$–$C_{60}$ alpha olefin monomers.

In accordance with the invention the foregoing advantages have also been achieved through the present drag reducing agent comprising a polyalphaolefin and at least one alpha olefin monomer partitioning agent.

A further feature of the drag reducing agent is that the at least one alpha olefin monomer partitioning agent may be selected from the group consisting of $C_{20}$–$C_{60}$ alpha olefin monomers.

In accordance with the invention the foregoing advantages have also been achieved through the present drag reducing agent comprising a polyalphaolefin and at least one alpha olefin monomer partitioning agent formed by contacting alpha olefin monomers with a catalyst in a reactant mixture having at least one alpha olefin monomer partitioning agent; and polymerizing the alpha olefin monomers, wherein during the polymerization, at least a portion of the alpha olefin monomers polymerize in the reactant mixture to provide a polyalphaolefin.

In accordance with the invention the foregoing advantages have also been achieved through the present drag reducing agent comprising a polyalphaolefin and at least one alpha olefin monomer partitioning agent formed by contacting alpha olefin monomers with a catalyst in a reactant mixture; polymerizing the alpha olefin monomers, wherein during the polymerization, at least a portion of the alpha olefin monomers polymerize in the reactant mixture to provide a polyalphaolefin; and mixing the polyalphaolefin with at least one alpha olefin monomer partitioning agent.

In accordance with the invention the foregoing advantages have also been achieved through the present process for reducing drag in a conduit, comprising: forming a drag reducing agent comprising a polyalphaolefin and at least one alpha olefin monomer partitioning agent, wherein the drag reducing agent is formed by contacting alpha olefin monomers with a catalyst in a reactant mixture having at least one alpha olefin monomer partitioning agent; polymerizing the alpha olefin monomers, wherein during the polymerization, at least a portion of the alpha olefin monomers polymerize in the reactant mixture to provide a polyalphaolefin; and introducing the drag reducing agent into the conduit.

In accordance with the invention the foregoing advantages have also been achieved through the present process for reducing drag in a conduit, comprising: forming a drag reducing agent comprising a polyalphaolefin and at least one alpha olefin monomer partitioning agent, wherein the drag reducing agent is formed by contacting alpha olefin monomers with a catalyst in a reactant mixture; polymerizing the alpha olefin monomers, wherein during the polymerization, at least a portion of the alpha olefin monomers polymerize in the reactant mixture to provide a polyalphaolefin; mixing the polyalphaolefin with at least one alpha olefin monomer partitioning agent; and introducing the drag reducing agent into the conduit.

In accordance with the invention the foregoing advantages have also been achieved through the present process for forming a drag reducing agent comprising a polyalphaolefin and at least one alpha olefin monomer partitioning agent, the process comprising: contacting alpha olefin monomers with a catalyst in a reactant mixture; polymerizing the alpha-olefin monomers, wherein during the polymerization, at least a portion of the alpha olefin monomers polymerize in the reactant mixture to provide a polyalphaolefin; and mixing the polyalphaolefin with at least one alpha olefin partitioning agent.

A further feature of the process for forming a drag reducing agent comprising a polyalphaolefin and at least one alpha olefin monomer partitioning agent is that the at least one alpha olefin partitioning agent may be selected from the group consisting of $C_{20}$–$C_{60}$ alpha olefin monomers. Another feature of the process for forming a drag reducing agent comprising a polyalphaolefin and at least one alpha olefin monomer partitioning agent is that the process may further comprise the step of cryogrinding the polyalphaolefin and at least one alpha olefin partitioning agent.

The alpha olefin monomer partitioning agents, methods of reducing drag in a conduit, and methods of forming drag reducing agents have the advantages of: decreasing the cost of production of drag reducing agents having partitioning agents; and decreasing the instances of hydrocarbon fouling caused by partitioning agents.

DETAILED DESCRIPTION OF THE INVENTION

The following detailed description refers to certain details and specific aspects of the invention, including specific embodiments and examples of the invention. Also, for purposes of better understanding the invention, certain terms will now be explained and defined. It is to be understood that the invention is not limited or restricted to the specific examples and embodiments described below, which are included to assist a person skilled in the art in practicing the invention. On the contrary, it is intended to cover all alternatives, modifications, and equivalents, as may be included within the spirit and scope of the invention as defined by the appended claims.

The term "drag reducing agent" (DRA) as used herein refers to a composition that includes at least the formed polyalphaolefin polymer and at least one alpha olefin monomer partitioning agent. The term "polyalphaolefin" refers to the polymer material formed by the polymerization of alpha olefin monomers, and is broadly construed to include not only the polymer in its final form, but also any intermediate polymers being formed, sometimes referred to as "oligomers." Preferably, the polyalphaolefin polymer is amorphous, i.e., the polyalphaolefin has no crystalline structures, or habits, existing in a single phase with substantially no solid particles, and has an ultra-high molecular weight and inherent viscosity of 10 dL/g or greater.

"Ultra-high molecular weight," means a molecular weight corresponding to an inherent viscosity of at least about 10 dL/g. Because of the extremely high molecular weight of the DRA polymer, it is difficult to reliably and accurately measure the actual molecular weight, but inherent viscosity provides a useful approximation of molecular weight. "Inherent viscosity" is measured using a Cannon-Ubbelohde four bulb shear dilution viscometer (0.1 g polymer/100 ml toluene at 25° C.). Inherent viscosities are calculated for each of the four bulbs. The viscosities are then plotted as a function of shear rate. The plot is then used to determine the inherent viscosity at a shear rate of 300 sec–1. It is contemplated that an inherent viscosity of 10 dL/g corresponds roughly to a molecular weight of at least about 10 or 15 million. Preferably, the ultra-high molecular weight polyalphaolefins have molecular weights even higher, e.g., greater than 25 million. The polyalphaolefins formed preferably have a narrow molecular weight distribution. Because different assumptions about the properties of the polyalphaolefin can yield different estimates of molecular weights, the inventors prefer using inherent viscosity to characterize the molecular weights of their drag reducing agents.

While the polyalphaolefin polymer may be formed using any method known to persons skilled in the art (e.g., using the methods disclosed in U.S. Pat. Nos. 3,692,676; 4,289,679; 4,358,572; 4,433,123; 4,493,903; 4,493,904; 5,244,937; 5,449,732; 5,504,131; 5,504,132; and 5,539,044, all of which are hereby incorporated by reference), the polyalphaolefin polymer is preferably made in accordance with the methods described in U.S. Pat. Nos. 5,869,570 and 6,015,779, both of which are hereby incorporated by reference. Generally, the polyalphaolefin polymer is formed by contacting alpha olefin monomers, e.g., alpha olefins monomers having 2 to 20 carbon atoms, with a catalyst in a reactant mixture. Homopolymers, copolymers and terpolymers may be used. Preferred alpha olefins include ethylene, propylene, 1-butene, 4-methyl-1-pentene, 1-hexene, 1-octene, 1-decene, 1-dodecene and 1-tetradecene; conjugated or unconjugated dienes such as butadiene and 1, 4-hexadiene; aromatic vinyls such as styrene; and cyclic olefins such as cyclobutene. Most preferably, the alpha olefin monomers are co-polymers of 1-hexene and 1-dodecene present in a 1:1 mole ratio; or co-polymers of 1-octene and 1-tetradecene present in a 1:1 mole ratio.

In one preferred embodiment, disclosed in U.S. Pat. No. 6,015,779, alpha olefin monomers are contacted with a catalyst and a co-catalyst system having at least one co-catalyst. While it is contemplated that any catalyst known to persons skilled in the art may be utilized, e.g., metallocene or Ziegler-Natta catalysts, preferred catalysts include transition metal catalysts such as those catalysts containing titanium trichloride, titanium tetrachloride or metallocene or combinations thereof. Preferably, the transition metal catalysts are non-metallocene. Titanium trichloride, which is most preferred, has been used for years in making drag reducing agents, and is preferably used in an amount ranging from at least about 100 to 1500 parts per million (ppm) based on the weight of all the components, i.e., the alpha olefins, co-catalysts, and catalysts supplied to the reactor.

Co-catalysts have also been used for years to form drag reducing agents. It is contemplated that any co-catalyst known to persons skilled in the art may be included with the catalyst; however, preferred co-catalysts includes one or more co-catalyst selected from the group consisting of alkylaluminoxanes, halohydrocarbons, diethylaluminum chloride ("DEAC") and dibutylaluminum chloride ("DIBAC"). As mentioned above, the process of forming the drag reducing agent may include no co-catalyst, one co-catalyst, or a plurality of co-catalysts.

The alpha olefin monomers may be polymerized at a temperature at about or less than 25° C., and preferably, at about or less than 10° C., wherein during the polymerization, at least a portion of the alpha olefin monomers polymerize in the reactant mixture to provide a polyalphaolefin. Preferably, the alpha olefin monomers are polymerized at a temperature of about −5° C.

Partitioning agents, also known as coating agents, are compositions that help prohibit polyalphaolefin polymer particles from sticking together in large clumps, thereby facilitating the dispersion of the polyalphaolefin in the hydrocarbon in the conduit. The partitioning agents may be added to the reactant mixture, i.e., during polymerization, after polymerization, and/or during grinding of the polyalphaolefin into fine polymer particles.

The alpha olefin monomer partitioning agents of the present invention are solid at ambient temperatures, i.e., at temperature at which polymerization occurs. In other words, the alpha olefin monomer partitioning agents have a melting point that is higher than the alpha olefin monomers that undergo polymerization. Therefore, in one specific embodiment in which the alpha olefin monomer partitioning agents are included in the reactant mixture, the alpha olefin monomer partitioning agents do not undergo polymerization.

Generally, alpha olefin monomer partitioning agents that are solid at ambient temperature are $C_{20}$ to $C_{65}$ alpha olefin monomers. However, it is contemplated that solid $C_2$ through $C_{19}$ alpha olefin monomers, as well as solid $C_{66}$ and greater alpha olefin monomers, may also be designed to be suitable partitioning agents of the present invention provided these alpha olefin monomers have a melting point that is higher than the temperature at which the polymerization of the alpha olefin monomers occurs.

In one embodiment, the alpha olefin monomer partitioning agents of the present invention are included in the reactant mixture. Because the alpha olefin monomer partitioning agents do not polymerize, they remain functional, i.e., prohibit polyalphaolefin polymer from sticking together. In this embodiment, the alpha olefin monomer partitioning agent is present in the reactant mixture in an amount ranging from at least about 10 to about 50 weight percent based upon the weight of all of the components, e.g., alpha olefin monomers, catalyst, co-catalyst(s), etc., of the reactant mixture. Preferably, the alpha olefin monomer partitioning agent is present in the reactant mixture at a concentration of at least about 25 weight percent.

Alternatively, the alpha olefin monomer partitioning agents of the present invention may be mixed with the polyalphaolefin prior to, or during, cryogrinding as disclosed in U.S. Pat. Nos. 5,244,937; 5,449,732; 5,504,131; 5,504,132; and 5,539,044. In these embodiments, the alpha olefin monomer partitioning agent is combined with the polyalphaolefin in an amount ranging from at least about 10 to about 50 weight percent based upon the weight of all of the components, e.g., polyalphaolefin, unpolymerized alpha olefin monomers, unused catalyst, unused co-catalyst(s), etc., undergoing cryogrinding. Preferably, the alpha olefin monomer partitioning agent is present at a concentration of at least about 25 weight percent.

Drag reducing agent slurries may be formed by mixing the drag reducing agent with at least one slurry component. Numerous slurry components are known to persons skilled in the art. Examples of suitable slurry components are disclosed in U.S. Pat. Nos. 5,244,937; 5,449,732; 5,504,131; 5,504,132; and 5,539,044.

Additionally, dispersing agents may be included in the reactant mixture. Preferably, the dispersants of this invention do not substantially impair the polymerization process. While any dispersant known to persons skilled in the art may be utilized, examples of suitable dispersants include, alone or in combination, copolymers of polyacrylic acid; polymethacrylic acid; copolymers of polymethacrylic acid; polyethylene; copolymers of polyethylene; polynonylphenol and/or polybutylphenol, including copolymers of polynonylphenol and polybutylphenol, in combination with ethylene oxide and/or propylene oxide; polymers and copolymers of petroleum sulfonates; and compounds containing ethylene glycol monobutyl ether. Preferred dispersants are polymers and copolymers of acrylates and methacrylates; polymers and copolymers of ethylene; polymers and copolymers produced from the polymerization of nonylphenol and butylphenol in combination with ethylene oxide and/or propylene oxide; compounds or blends of compounds containing petroleum sulfanates; compounds containing ethylene glycol monobutyl ether (butyl "Cellosolve"); and CARBOPOL®, sold by B. F. Goodrich Company.

The dispersant, which may be added prior to, or during, polymerization, modifies the viscosity of the reaction mixture and disperses the partitioning agent and polymer fines, i.e., finely ground polyalphaolefin particles, through out the reactant mixture. The concentration of the dispersant in the reactant mixture is preferably from about 0.5 ppm to about 50,000 ppm of the reactant mixture. Alternatively, the dispersant may be added after polymerization, before, after, or at the same time the slurry component is mixed with the drag reducing agent or polyalphaolefin to form the drag reducing agent slurry. In this embodiment, the concentration of the dispersant is preferably from about 0.5 ppm to about 50,000 ppm.

Drag reducing agents comprising a polyalphaolefin and at least one alpha olefin monomer partitioning agent may be used to reduce drag in a conduit by adding the drag reducing agent to a conduit containing a hydrocarbon. Additionally, the drag reducing agent comprising a polyalphaolefin and at least one alpha olefin monomer partitioning agent may also be further processed by any method known to those skilled in the art to be utilized to reduce drag in a conduit.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A process for reducing drag in a conduit, comprising:

forming a drag reducing agent comprising a polyalphaolefin and at least one alpha olefin monomer partitioning agent, wherein the drag reducing agent is formed by contacting alpha olefin monomers with at least one catalyst in a reactant mixture, polymerizing the alpha olefin monomers, wherein during the polymerization at least a portion of the alpha olefin monomers polymerize in the reactant mixture to provide a polyalphaolefin, and adding to the reactant mixture at least one alpha olefin monomer partitioning agent, wherein the at least one alpha olefin monomer partitioning agent is selected from the group consisting of $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, $C_{50}$, $C_{51}$, $C_{52}$, $C_{53}$, $C_{54}$, $C_{55}$, $C_{56}$, $C_{57}$, $C_{58}$, $C_{59}$, and $C_{60}$ alpha olefin monomers, and mixtures thereof; and introducing the drag reducing agent into the conduit.

2. The process of claim 1, wherein the at least one alpha olefin monomer partitioning agent includes $C_{30}$ alpha olefin monomer.

3. The process of claim 2, wherein during the polymerization substantially all of the alpha olefin monomers polymerize in the reactant mixture to provide the polyalphaolefin.

4. The process of claim 3, further comprising the step of cryogrinding the polyalphaolefin and the at least one alpha olefin monomer partitioning agent.

5. The process of claim 4, further comprising the step of mixing the cryoground polyalphaolefin and the at least one alpha olefin monomer partitioning agent with a suspending component to form a drag reducing agent slurry.

6. The process of claim 1, wherein during the polymerization substantially all of the alpha olefin monomers polymerize in the reactant mixture to provide a polyalphaolefin.

7. The process of claim 6, further comprising the step of cryogrinding the polyalphaolefin and the at least one alpha olefin monomer partitioning agent.

8. The process of claim 7, further comprising the step of mixing the cryoground polyalphaolefin and the at least one alpha olefin monomer partitioning agent with a suspending component to form a drag reducing agent slurry.

9. The process of claim 1, further comprising the step of cryogrinding the polyalphaolefin and the at least one alpha olefin monomer partitioning agent.

10. The process of claim 9, further comprising the step of mixing the cryoground polyalphaolefin and the at least one alpha olefin monomer partitioning agent with a suspending component to form a drag reducing agent slurry.

11. A process for forming a drag reducing agent comprising a polyalphaolefin and at least one alpha olefin monomer partitioning agent, the process comprising:

contacting alpha olefin monomers with at least one catalyst in a reactant mixture;

polymerizing the alpha olefin monomers, wherein during the polymerization at least a portion of the alpha olefin monomers polymerize in the reactant mixture to provide a polyalphaolefin; and adding to the reactant mixture at least one alpha olefin monomer partitioning agent, wherein the at least one alpha olefin monomer partitioning agent is selected from the group consisting of $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, $C_{50}$, $C_{51}$, $C_{52}$, $C_{53}$, $C_{54}$, $C_{55}$, $C_{56}$, $C_{57}$, $C_{58}$, $C_{59}$, and $C_{60}$ alpha olefin monomers, and mixtures thereof.

12. The process of claim 11, wherein the at least one alpha olefin monomer partitioning agent includes $C_{30}$ alpha olefin monomer.

13. The process of claim 12, wherein during the polymerization substantially all of the alpha olefin monomers polymerize in rho reactant mixture to provide a polyalphaolefin.

14. The process of claim 13, further comprising the step of cryogrinding the polyalphaolefin and the at least one alpha olefin monomer partitioning agent.

15. The process of claim 14, further comprising the step of mixing the cryoground polyalphaolefin and the at least one alpha olefin monomer partitioning agent with a suspending component to form a drag reducing agent slurry.

16. The process of claim 11, wherein during the polymerization substantially all of the alpha olefin monomers polymerize in the reactant mixture to provide a polyalphaolefin.

17. The process of claim 16, further comprising the step of cryogrinding the polyalphaolefin and the at least one alpha olefin monomer partitioning agent.

18. The process of claim 17, further comprising the step of mixing the cryoground polyalphaolefin and the at least one alpha olefin monomer partitioning agent with a suspending component to form a drag reducing agent slurry.

19. The process of claim 11, further comprising the step of cryogrinding the polyalphaolefin and the at least one alpha olefin monomer partitioning agent.

20. The process of claim 19, further comprising the step of mixing the cryoground polyalphaolefin and the at least one alpha olefin monomer partitioning agent with a suspending component to form a drag reducing agent slurry.

21. The process of claim 11, wherein the at least one alpha olefin monomer partitioning agent is added to the reactant mixture after substantially all of the alpha olefin monomers polymerize in the reactant mixture to provide the polyalphaolefin.

22. The process of claim 21, further comprising the step of cryogrinding the polyalphaolefin and the at least one alpha olefin monomer partitioning agent.

23. The process of claim 22, further comprising the step of mixing the cryoground polyalphaolefin and the at least one alpha olefin monomer partitioning agent with a suspending component to form a drag reducing agent slurry.

24. The process of claim 11, wherein the at least one alpha olefin monomer partitioning agent is $C_{30}$ alpha olefin monomer.

25. The process of claim 24, wherein the at least one alpha olefin monomer partitioning agent is added to the reactant mixture after substantially all of the alpha olefin monomers polymerize in the reactant mixture to provide the polyalphaolefin.

26. The process of claim 25, further comprising the step of cryogrinding the polyalphaolefin and the at least one alpha olefin monomer partitioning agent.

27. The process of claim 26, further comprising the step of mixing the cryoground polyalphaolefin and the at least one alpha olefin monomer partitioning agent with a suspending component to form a drag reducing agent slurry.

28. The process of claim 11, wherein the at least one alpha olefin monomer partitioning agent is added to the reactant mixture after polymerization is completed.

29. The process of claim 11, wherein polymerization of the alpha olefin monomers is halted prior to the addition of the at least one alpha olefin monomer partitioning agent.

* * * * *